United States Patent
Freeze et al.

(10) Patent No.: US 6,230,014 B1
(45) Date of Patent: May 8, 2001

(54) METHOD OF CONTROLLING HANDOFF OF COMMUNICATIONS WITH A MOBILE STATION FROM A FIRST RADIO TRANSCEIVER TO A SECOND RADIO TRANSCEIVER

(75) Inventors: John Mark Freeze, Raleigh; Ronald L. Bexten, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/168,787

(22) Filed: Oct. 8, 1998

(51) Int. Cl.[7] ........................................ H04Q 7/22
(52) U.S. Cl. ............................ 455/442; 455/525
(58) Field of Search ........................ 455/442, 436, 455/437, 438, 439, 445, 450, 451, 452, 453, 524, 525; 370/331, 337

(56) References Cited

U.S. PATENT DOCUMENTS 5,483,668 * 1/1996 Malkamaki et al. ................. 455/442

FOREIGN PATENT DOCUMENTS

| 0 281 111 | 9/1988 | (EP) . |
| 0 577 322 | 1/1994 | (EP) . |
| 281 177 | 2/1995 | (GB) . |

\* cited by examiner

Primary Examiner—William G. Trost
Assistant Examiner—Philip J. Sobutka
(74) Attorney, Agent, or Firm—Wood, Phillips, VanSanten, Clark & Mortimer

(57) ABSTRACT

A method is provided for controlling handoff of communications with a mobile station from a first radio transceiver to a second radio transceiver in a communication system having a common baseband processing unit operably connected to each of the radio transceivers. In one form, the method includes the steps of maintaining respective first and second voice paths with modulated signals uplinked from the first and second radio transceivers to the common baseband processing unit while communications with the mobile station are handed off from the first radio transceiver to the second radio transceiver.

3 Claims, 3 Drawing Sheets

METHOD OF CONTROLLING HANDOFF OF COMMUNICATIONS WITH A MOBILE STATION FROM A FIRST RADIO TRANSCEIVER TO A SECOND RADIO TRANSCEIVER

FIELD OF THE INVENTION

This invention relates to mobile communication systems and methods, and in particular, to handing off communications with a mobile station from a first radio transceiver to a second radio transceiver in a mobile communication system where the first and second radio transceivers service the same or different coverage areas of the mobile communication system.

BACKGROUND OF THE INVENTION

In traditional cellular type mobile communication systems, a mobile station is "handed off" from a servicing base station to a target base station when it appears that the signal quality with the target base station will be superior to the signal quality of the servicing base station. Typically "handoff" occurs when the mobile station is moving from the coverage area of the servicing base station into the coverage area of the target base station.

One type of handoff, commonly referred to as a "hard handoff", requires the mobile station to change the frequency and/or time slot of its communication signal when it is handed off from the servicing base station to the target base station. Commonly, a hard handoff is an asynchronous function in which the mobile station and the base station asynchronously perform a break-before-make switching. For example, an initial voice path is established between a mobile station and the servicing base station when the mobile station is in the coverage area of the servicing base station. When it is determined that the mobile station should be handed off from the servicing base station to the target base station, a handoff order is transmitted to the mobile station with instructions to switch to the frequency and/or time slot allocated for the target base station, and in response, the mobile station retunes to the allocated frequency and/or time slot and synchronizes with the target base station. Next, via signalling between the base station and the communication system, the target base station verifies the presence of the mobile station, and the communication system establishes a voice path to the mobile station through the target base station. The period of time between the handoff order and the reestablishment of the voice path through the target base station is commonly referred to as the handoff period and often is in the range of 1–3 seconds. The handoff period results in a loss of voice communications and degradation in voice quality that may exceed what is acceptable, particularly for mobile communication systems that are intended to replicate the quality of traditional fixed communication systems.

Another type of hard handoff occurs when the communication signal with the mobile station at a particular frequency and time slot experiences some type of disturbance or degradation not necessarily associated with moving from one coverage area into another coverage area. In this type of hard handoff, the mobile station retunes from its current frequency and/or time slot to a new frequency and/or time slot, without switching from the servicing base station.

More detailed descriptions of various mobile communication systems and the handoff procedures used therein are contained in "Wireless and Personal Communication Systems", Vijay K. Garg and Joseph E. Wilkes, published in 1996 by Prentice Hall PTR and "Cellular Radio Systems", D. M. Balston and R. C. V. Macario published in 1993 by Artech House Publishers, the disclosures of which are incorporated herein by reference.

SUMMARY OF THE INVENTION

In one aspect of the present invention, a method is provided for controlling handoff of communications with a mobile station from a first radio transceiver to a second radio transceiver in a communication system. The method includes the steps of maintaining a first voice path at a first frequency and a first time slot with the mobile station through the first radio transceiver, and while the mobile station is tuned to the first voice path, establishing a second voice path at a second frequency and a second time slot through the second radio transceiver, with at least one of the second frequency and the second time slot being different from the first frequency and the first time slot, respectively.

In accordance with one aspect of the invention, a method is provided for controlling handoff of communications with a mobile station from a first radio transceiver to a second radio transceiver in a communication system having a common baseband processing unit operably connected to each of the radio transceivers.

In one aspect, the method includes the steps of maintaining respective first and second voice paths with modulated signals uplinked from the first and second radio transceivers to the common baseband processing unit while communications with the mobile station are handed off from the first radio transceiver to the second radio transceiver.

In one aspect, the method includes the steps of maintaining a first voice path at a first frequency and a first time slot between the mobile station and the common baseband processing unit through the first radio transceiver; while the mobile station is tuned to the first voice path, establishing the second voice path at a second frequency in a second time slot between the common baseband processing unit and the second radio transceiver, with at least one of the second frequency and the second time slot being different from the first frequency and the first time slot, respectively; and transmitting a handoff order to the mobile station from the common baseband processing unit through the first radio transceiver, the handoff order being to switch to the second voice path at the second frequency and the second time slot.

In one aspect, the method further includes the step of monitoring both the first and second voice paths at the same time to determine which path is currently carrying voice data from the mobile station.

In one aspect, the method further includes the step of monitoring both the first and second voice paths at the same time to determine when to route voice data carried by the second voice path from the mobile station through to a switching system operably associated with the communication system.

In one aspect, the method further includes the step of transmitting, at the same time, downlinked voice signals intended for the mobile station via both the first voice path from the first radio transceiver and the second voice path from the second radio transceiver.

It is an object of the invention to provide an improved method for controlling handoff of communications with a mobile station from a first radio transceiver to a second radio transceiver in a communication system.

It is another object of the invention to provide a method and apparatus for hard handoffs that minimizes loss of voice communications and degradation in voice quality.

Other aspects, objects and advantages of the present invention can be obtained from a study of the application, the drawings, and the appended claims.

DETAILED DESCRIPTION OF THE PREFERRED EMBODIMENTS

Figure 1:
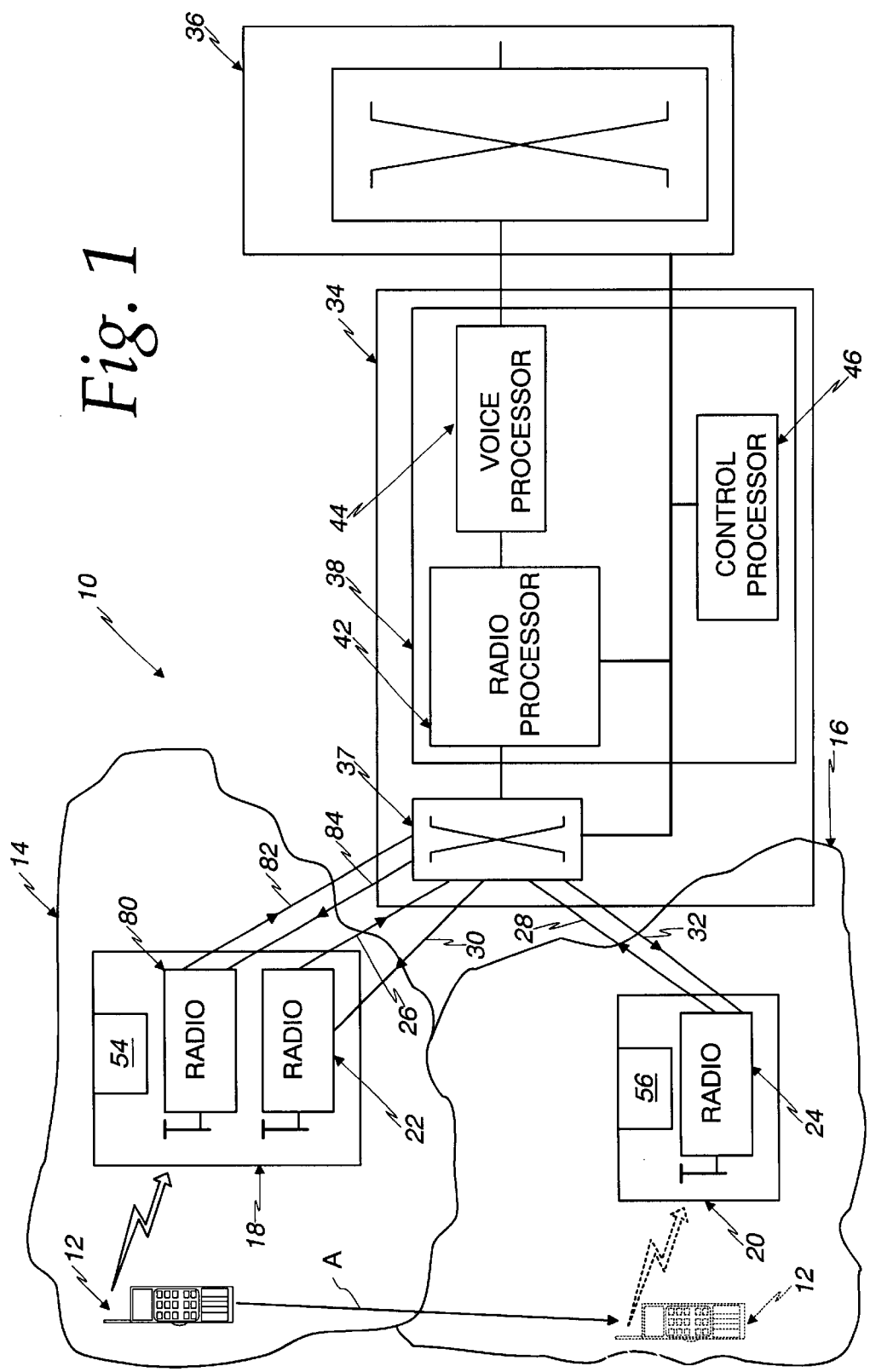
FIG. 1 is a diagrammatic illustration of a communication system employing the method of the invention.

As seen in FIG. 1, a mobile communication system 10 supports communications with a mobile station 12 as the mobile station 12 travels through coverage areas 14 and 16 of the mobile communication system 10, as indicated by arrow A. Preferably, the mobile communication system 10 is a digital mobile communication system. The different coverage areas 14 and 16 are serviced by base stations or radio heads 18 and 20, respectively. The radio heads 18 and 20 include at least one radio transceiver 22 and 24, respectively, each having respective uplinks 26 and 28 and downlinks 30 and 32 with a cellular radio exchange 34. The cellular radio exchange 34 connects communications with the mobile station 12 through the radio heads 18, 20 to one or more switching systems 36, such as a public switched telephone network, private branch exchange, public land mobile telecommunication system, micro cellular communications network, universal mobile telecommunications system, satellite communication systems, and/or networked cellular telephone base stations.

The cellular radio exchange 34 includes a switch 37 and a baseband processing unit 38 capable of simultaneously receiving and processing modulated communication signals from both the radio transceivers 22 and 24 via the respective uplinks 26 and 28 through the switch 37. The baseband processing unit 38 includes a radio processor 42, a voice processor 44 and a control processor 46 which are configured to process the uplinked and downlinked communication signals with the radio heads 18 and 20 via the uplinks 26,28 and downlinks 30,32. Preferably, the radio heads 18, 20 are time synchronized and are capable of using the synchronized handoff capability of IS-136, Rev. A.

It should be understood that while only two distinct coverage areas 14 and 16 are illustrated for purposes of describing the invention, the invention contemplates that more than two distinct coverage areas, each serviced by a dedicated radio head, may be provided for in the communication system 10, with the cellular radio exchange 34 having uplinks and downlinks with each of the radio heads, and the baseband processing unit 38 being capable of simultaneously processing uplinked and downlinked communication signals for a single voice call with any two of the radio heads through the switch 37.

While many types of radio transceivers 22,24, uplinks 26,28, downlinks 30,32, switches 36,37, radio processors 42, and control processors 46 are well known and may be utilized to practice the invention with little or no modification, highly preferred embodiments of these components are described and illustrated in detail in co-pending applications Ser. No. 09/087,528, filed May 29, 1998, titled "SYSTEMS AND METHODS FOR UPLINKING DOWN-SAMPLED RADIOTELEPHONE SIGNALS FROM CELLULAR RADIOTELEPHONE BASE STATIONS TO A CELLULAR RADIO EXCHANGE", and naming inventors Olof Tomas Backstrom and Ronald L. Bexten; Ser. No. 08/753,437, filed Nov. 25, 1996, titled "A FLEXIBLE WIDEBAND ARCHITECTURE FOR USE IN RADIO COMMUNICATIONS SYSTEMS, and naming Ronald L. Bexten; Ser. No. 08/540,326, filed Oct. 6, 1995, titled "DISTRIBUTED INDOOR DIGITAL MULTIPLE-ACCESS CELLULAR TELEPHONE SYSTEM", and naming J. T. R. Dannelind, A. B. Forsen, C. M. Frodigh, B. G. Hedberg, C. F. U. Kronestedt, and Y. K. Wallstedt; and Ser. No. 09/087,357, filed May 29, 1998, titled "CELLULAR RADIOTELEPHONE SYSTEMS AND METHODS THAT BROADCAST A COMMON CONTROL CHANNEL OVER MULTIPLE RADIO FREQUENCIES", and naming Olof Tomas Backstrom and John M. Freeze; the entire disclosures of which are incorporated herein by reference.

Figure 2:
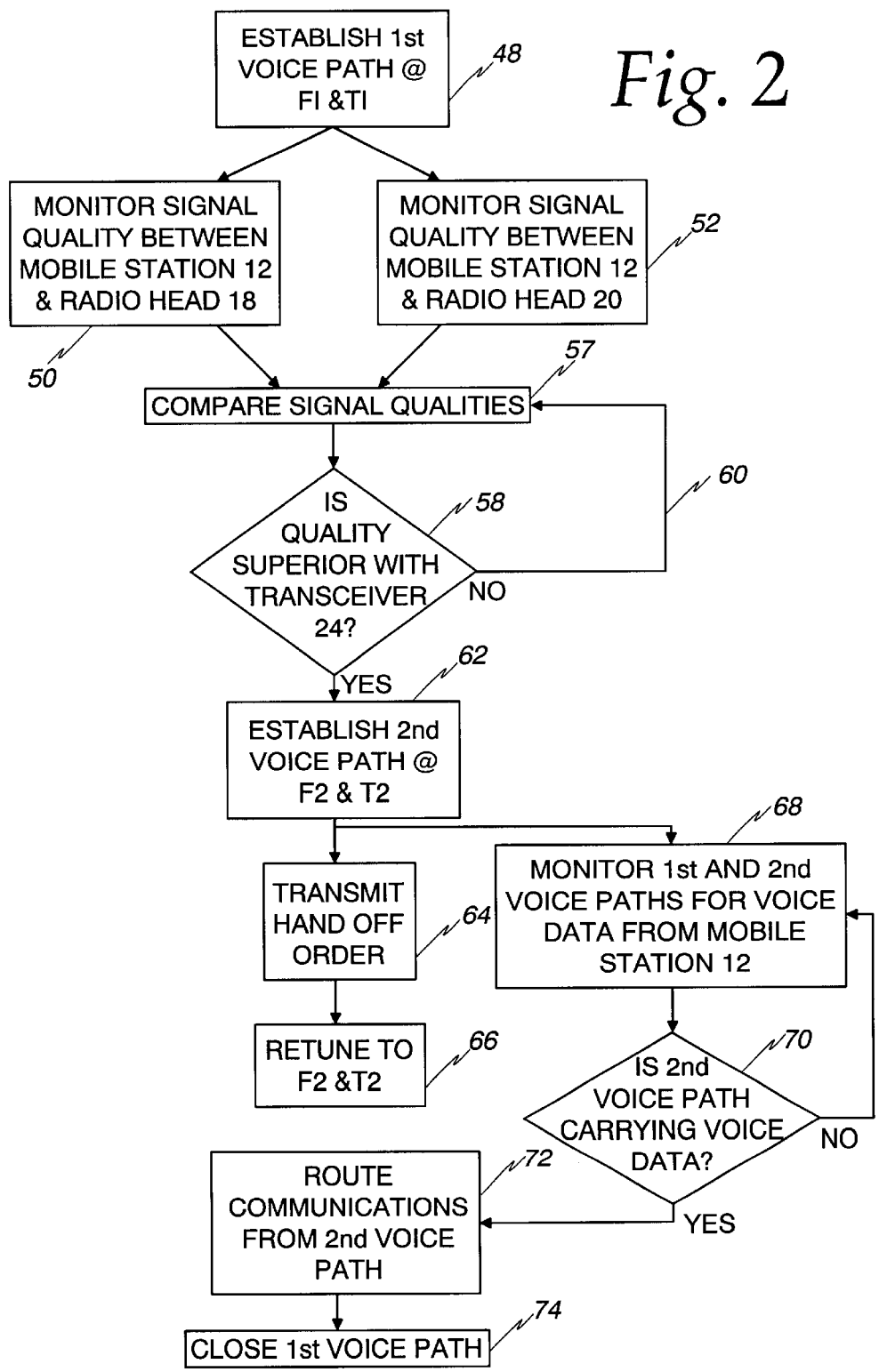
FIG. 2 is a flow diagram illustrating one embodiment of the method of the invention.

With reference to FIG. 2, to practice the invention, the communication system 10 is configured to establish a first voice path at a first frequency F1 and a first time slot T1 between the mobile station 12 and the communication system 10 through the radio transceiver 22 of the radio head 18, the uplink 26, the downlink 30, and the baseband processing unit 38, when the mobile station is in the coverage area 14, as shown at block 48. In the digital version of the system 10, control signals can be "interleaved" with the voice signals via the voice path at the first frequency F1 and time slot T1.

While the first voice path is operable (i.e., while the mobile station is tuned to F1 and T1), the system monitors a first signal quality between the mobile station 12 and the radio head 18, and a second signal quality between the mobile station 12 and the radio head 20 to determine when a handoff of the mobile station 12 from the radio head 18 to the radio head 20 is appropriate, as shown at blocks 50, 52, 57, 58, and 60. While a number of methods and apparatus are disclosed for performing such monitoring in both the Garg and Balston publications, in one embodiment of the system 10, the radio heads 18, 20 include scanning receivers 54 and 56, as shown in FIG. 1, which provide the monitoring of the first and second signal qualities, respectively. As shown at block 57, the cellular radio exchange 34 compares the first and second signal qualities of blocks 50 and 52 to determine when it is appropriate to handoff communications with the mobile station from the servicing radio head 18 to the target radio head 20. This determination is based upon whether it appears from the comparison that the signal quality between the mobile station 12 and the radio transceiver 24 is superior to the signal quality between the mobile station 12 and the radio transceiver 22, as shown at block 58.

If it appears that signal quality with radio head 20 is not superior to signal quality with radio head 18, the system continues comparing signal qualities, as indicated at 60. If it appears that the mobile station 12 has better signal quality with radio head 20 than with radio head 18, the system 10 establishes a second voice path at a second frequency F2 and a second time slot T2 between the baseband processing unit 38 and the radio transceiver 24, with at least one of the second frequency F2 and time slot T2 being different than the first frequency F1 and time slot T1, respectively, as shown at box 62. Either after the establishment of the second voice path, or while the second voice path is being established, the cellular radio exchange 34 instructs the mobile station 12 to retune to the second frequency F2 and time slot T2 by transmitting a handoff order to the mobile station 12 through the radio transceiver 22 via the downlink 30, as shown at block 64. Preferably, once the second voice path is established, the cellular radio exchange 34 begins transmitting downlinked voice signals intended for the mobile station 12 from the switching system 36 via the second voice path at the frequency F2 and time slot T2. It should be understood that during the entire sequence described above, the first voice path is maintained with the voice signals between the mobile station 12 and the switching system 36 being transmitted through the system 10 via the first voice path at the frequency F1 and time slot T1.

When the mobile station 12 receives the handoff order, the mobile station 12 retunes to the second frequency F2 and time slot T2 from the first frequency F1 and time slot T1, as shown at block 66. While in some embodiments the mobile station may have to synchronize with the radio head 20, in the preferred embodiment the mobile station 12 does not have to synchronize with the radio head 20 because the radio heads 18, 20 are synchronized and the synchronized handoff capability of IS-136 is employed. Because the second voice path has already been established through the transceiver 24, the transceiver 24 is already monitoring or "listening" for uplinked signals at the second frequency F2 and time slot T2, and, preferably, transmitting downlinked voice and/or control signals at the second frequency F2 and time slot T2. Because the baseband processing unit 38 is configured to simultaneously receive the uplinked signals on both the first and second voice paths via the respective uplinks 26, 28 from the transceivers 22, 24 in a modulated form, the cellular radio exchange 34 is capable of determining which voice path is carrying voice data or signals from the mobile station 12 on an air frame by air frame basis (i.e., 20 milliseconds or faster), thereby allowing the cellular radio exchange 34 to determine when it is appropriate to route the uplinked voice data or signals carried via the second voice path from the mobile station 12 to the switching system 36, as shown at blocks 68, 70, and 72. This allows the cellular radio exchange 34 to determine when the radio head 20 has contact with the mobile station 12, without all of the signalling between the target base station and the mobile switching center, and the time delay associated therewith, required in current systems. Accordingly, voice communications are resumed via the second voice path within a few air-frames of the mobile station 12 returning to the second frequency F2 and time slot T2. Thus, in the preferred embodiment, the only interruption in the voice communications with the mobile station 12 occurs during the time required for the mobile station 12 to retune to F2 and T2, typically about 100 milliseconds, depending on the type of mobile station and the frequency range between F1 and F2, plus the time required for the cellular radio exchange 34 to determine, on an air-frame by air-frame basis, when the second voice path is carrying voice data or signals from the mobile station 12. This is a much smaller interruption, less than 250 milliseconds and typically around 140 milliseconds, than the interruptions, typically around 1–3 seconds, that occur with conventional hard handoffs, and will minimize loss of voice communication signals and degradation of voice quality in comparison to conventional hard handoffs.

As shown at block 74, after the mobile station 12 begins uplinked voice communications via the second voice path, the cellular radio exchange 34 closes the first voice path to the radio head 18 to free up the resources allocated for the first voice path.

A further embodiment of the mobile communication system 10 as shown in FIG. 1, it is preferred that the radio heads 18, 20 include at least one additional radio transceiver. For example, the radio head 18 includes at least one additional radio transceiver 80 having an uplink 82 and a downlink 84 with the cellular radio exchange 34. Preferably, the radio transceiver 80, uplink 82, and downlink 84 are of the same type, respectively, as the radio transceiver 22, uplink 26 and downlink 30.

Figure 3:
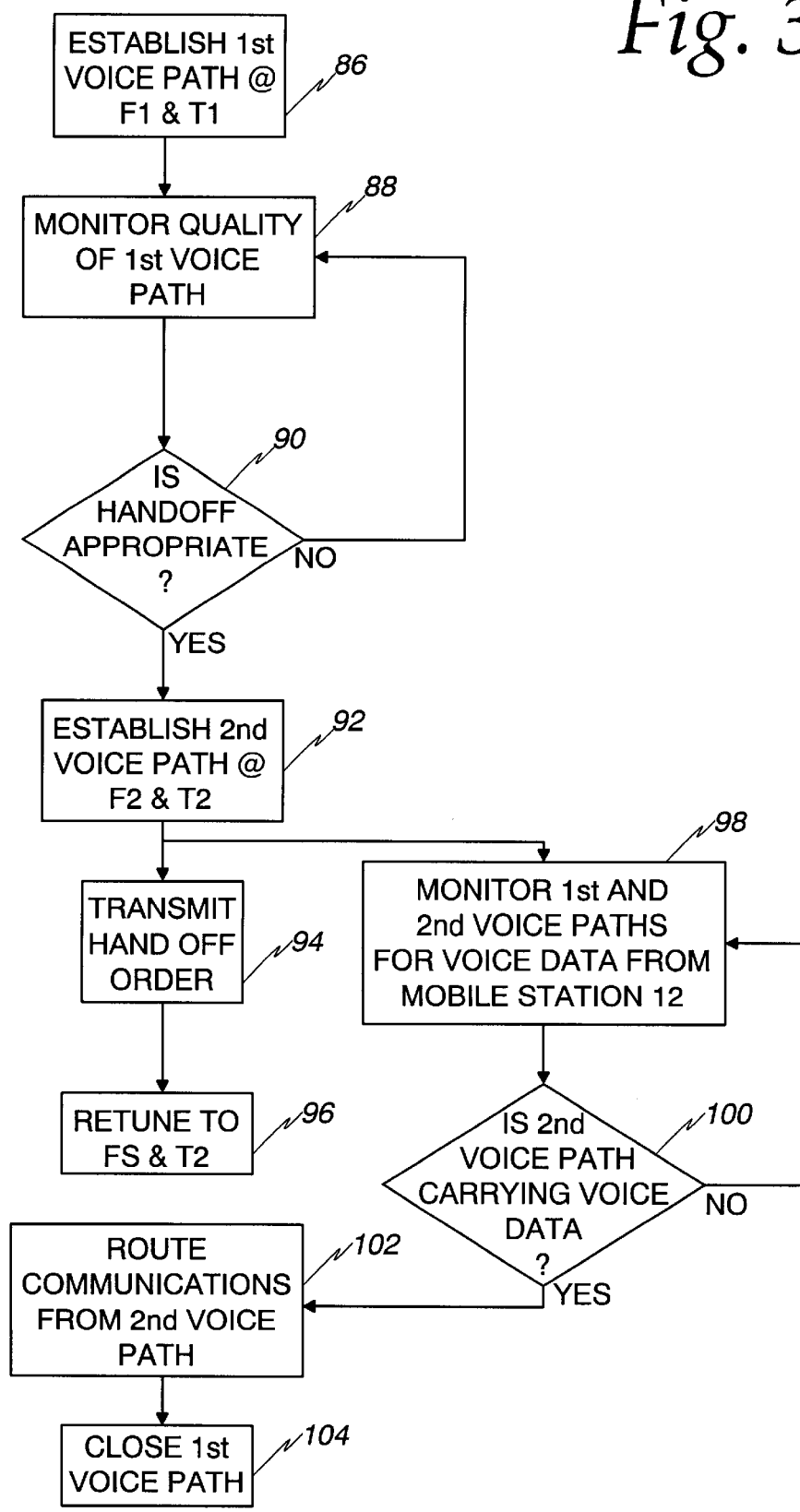
FIG. 3 is a flow diagram illustrating another embodiment of the method of the invention.

With reference to FIG. 3, to practice the invention, the communication system 10 is configured to establish the first voice path at the first frequency F1 and the first time slot T1 between the mobile station 12 and the communication system 10 through the radio transceiver 22, the uplink 26, the downlink 30, and the baseband processing unit 38, when the mobile station is in the coverage area 14, as shown at block 86. While the first voice path is operable (i.e., while the mobile station is tuned to F1 and T1), the system monitors the signal quality of the first voice path to determine if a handoff to a different frequency F2 and/or time slot T2 would be appropriate, as shown at blocks 88 and 90. If it appears that a handoff is appropriate, the system 10 establishes a second voice path at the second frequency F2 and the second time slot T2 between the baseband processing unit 38 and the radio transceiver 80, with at least one of the second frequency F2 and the time slot T2 being different than the first frequency F1 and time slot T1, respectively, at shown at block 92. Either after the establishment of the second voice path, or while the second voice path is being established, the cellular radio exchange 34 instructs the mobile station to retune to the second frequency F2 and time slot T2 by transmitting a handoff order to the mobile station 12 through the radio transceiver 22 via the downlink 30, as shown at block 94. Preferably, once the second voice path is established, the cellular radio exchange 34 begins transmitting downlinked voice signals intended for the mobile station 12 from the switching system 36 via the second voice path at the second frequency F2 and time slot T2 via transceiver 80. It should be understood that during the entire sequence described above, the first voice path is maintained with the voice signals between the mobile station 12 and the switching system 36 being transmitted through the system via the first voice path at the frequency F1 and time slot T1.

When the mobile station 12 receives the handoff order, the mobile station 12 retunes to the second frequency F2 and time slot T2 from the first frequency F1 and time slot T1, as shown at block 96. As with the handoff described in connection with FIG. 2, because the second voice path has already been established through the transceiver 80, the transceiver 80 is already monitoring or "listening" for uplink signals at the second frequency F2 and time slot T2, and, preferably, transmitting downlinked voice and/or control signals at the second frequency F2 and time slot T2. Because the baseband processing unit 38 is configured to simultaneously receive the uplink signals on both the first and second voice paths via the respective uplinks 26, 82 from the transceivers 22, 80 in a modulated form, the cellular radio exchange 34 is capable of determining which voice path is carrying voice data or signals from the mobile station on an airframe by airframe basis, thereby allowing the cellular radio exchange 34 to determine when it is appropriate to route the uplinked voice data or signals carried by the second voice path from the mobile station 12 to the switching system 36, as shown at blocks 98, 100, and 102. Again, this allows the cellular radio exchange 34 to determine when the transceiver 80 has contact with the mobile station 12, without all of the signalling required in current systems. Accordingly, voice communications are resumed via the second voice path within a few airframes of the mobile station 12 retuning to the second frequency F2 and time slot T2. Thus, as with the handoff of FIG. 2, the only interruption in the voice communications with the mobile station 12 occurs during the time required for mobile station 12 to retune to F2 and T2, plus the time required for the cellular radio exchange 34 to determine, on an airframe by airframe basis, when the second voice path is carrying voice data or signals from the mobile station 12. Again, this is a much smaller interruption than the interruptions that occur with conventional hard handoffs, and will minimize loss of voice communication signals and degradation of voice quality in comparison to conventional hard handoffs.

As shown at block 104, after the mobile station 12 begins uplinked voice communications via the second voice path, the cellular radio exchange 34 closes the first voice path to the transceiver 22 to free up the resources allocated for the first voice path.

It should be understood that it is preferred for the system 10 to include a plurality of radio heads, with each radio head having a plurality of radio transceivers, so that the system 10 can perform either the type of handoff described in connection with FIG. 2, or the type of handoff described in connection with FIG. 3, as required. In this regard, it should be appreciated that when performing either type of handoff, the system 10 will have to determine which radio transceivers are available for establishment of the second voice path prior to establishing the second voice path. Further, it should be understood that, prior to establishing the second voice path, the system 10 will have to determine which frequencies and time slots are available for the second voice path. If adequate resources are currently unavailable for the second voice path, the handoff will have to be delayed until such resources are available.

It should be appreciated that by establishing the second voice path prior to, or simultaneously with, the handoff order to the mobile station 12, the hard handoff method of the system 10 minimizes loss of voice communication signals and degradation of voice quality in comparison to conventional hard handoffs.

What is claimed is:

1. A method of controlling handoff of communications with a mobile station from a first radio transceiver to a second radio transceiver in a communication system having a common baseband processing unit operably connected to each of the radio transceivers, the method comprising the steps of:

maintaining respective first and second voice paths with modulated signals uplinked from the first and second radio transceivers to the common baseband processing unit while communications with the mobile station are handed-off from the first radio transceiver to the second radio transceiver;

monitoring both the first and second voice paths at the same time to determine which path is currently carrying uplinked voice data from the mobile station; and routing uplinked voice data carried by the second voice path from the mobile station through to a switching system operably associated with the communication system in response to the monitoring step determining that the second voice path is currently carrying uplinked voice data from the mobile station.

2. The method of claim 1 further comprising the steps of:

maintaining the first voice path at a first frequency and a first time slot between the mobile station and the common baseband processing unit through the first radio transceiver; and while the mobile station is tuned to the first voice path, establishing the second voice path at a second frequency and a second time slot between the common baseband processing unit and the second radio transceiver, at least one of the second frequency and the second time slot being different from the first frequency and the first time slot, respectively.

3. The method of claim 2 further comprising the step of transmitting, at the same time, downlinked voice signals intended for the mobile station via both the first voice path from the first radio transceiver and the second voice path from the second radio transceiver.

* * * * *